United States Patent [19]
Bruder et al.

[11] Patent Number: 5,019,165
[45] Date of Patent: May 28, 1991

[54] RECORDING FLUID FOR THE INK JET PROCESS

[75] Inventors: Horst Bruder, Ludwigshafen; Udo Mayer, Frankenthal, both of Fed. Rep. of Germany

[73] Assignee: BASF Aktiengesellschaft, Ludwigshafen, Fed. Rep. of Germany

[21] Appl. No.: 292,432

[22] Filed: Dec. 30, 1988

[30] Foreign Application Priority Data

Jan. 15, 1988 [DE] Fed. Rep. of Germany ....... 3800983

[51] Int. Cl.[5] .............................................. C09D 11/02
[52] U.S. Cl. ...................................... 106/22; 534/604; 534/614; 534/797
[58] Field of Search .................. 106/22; 534/604, 614, 534/797

[56] References Cited

U.S. PATENT DOCUMENTS

| | | | |
|---|---|---|---|
| 4,176,361 | 11/1979 | Kawada et al. | 106/20 |
| 4,333,874 | 6/1982 | Nickel et al. | 534/603 |
| 4,558,121 | 12/1985 | Fasciati et al. | 534/797 |
| 4,605,442 | 8/1986 | Kawashita et al. | 534/797 |
| 4,627,875 | 12/1986 | Kobayashi et al. | 106/22 |

FOREIGN PATENT DOCUMENTS

| | | |
|---|---|---|
| 2933031 | 9/1979 | Fed. Rep. of Germany . |
| 2933030 | 3/1981 | Fed. Rep. of Germany . |

*Primary Examiner*—William R. Dixon, Jr.
*Assistant Examiner*—Helene Klemanski
*Attorney, Agent, or Firm*—Oblon, Spivak, McClelland, Maier & Neustadt

[57] ABSTRACT

A recording fluid for the ink jet process contains a water-miscible organic solvent and a dye of the formula

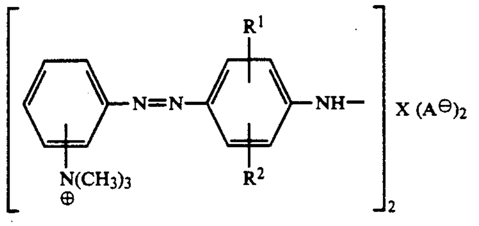

where $R^1$ and $R^2$ are each independently of the other hydrogen, $C_1$–$C_4$-alkyl or $C_1$–$C_4$-alkoxy, $A^{\ominus}$ is an anion and X is a bridge member of the formula —CO— or 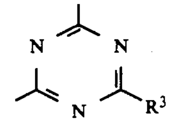

where $R^3$ is chlorine, hydroxy, $C_1$–$C_6$-alkoxy, amino, $C_1$–$C_4$-monoalkyl- or dialkyl-amino, anilino, N-($C_1$–$C_4$-alkyl)anilino, pyrrolidino, piperidino, morpholino, piperazino or N-($C_1$–$C_4$-alkyl)piperazino.

2 Claims, No Drawings

RECORDING FLUID FOR THE INK JET PROCESS

The present invention relates to a novel recording fluid for the ink jet process, containing a water-miscible organic solvent and a cationic azo dye whose diazo component is derived from a diaminobenzene derivative and whose coupling component is derived from aniline or an aniline derivative, this azo dye being doubled by means of a bridge member.

The ink jet process is known per se. In this process, droplets of a writing fluid are directed from one or more small nozzles at a substrate, for example paper, wood, textiles, plastic material or metal, in an electronically controlled manner whereby the individual droplets are organized into characters or graphic patterns.

Recording fluids suitable for the ink jet process generally contain dyes which are soluble in water and/or organic solvents as colorants. However, some of these dyes have deficient application properties, for example poor water fastness or smudge resistance.

It is an object of the present invention to provide a novel ink jet process recording fluid in which the dyes present therein should have a favorable range of application properties.

We have found that this object is achieved with a novel recording fluid for the ink jet process, containing a dye and a water-miscible organic solvent, wherein the dye is a dye of the formula I

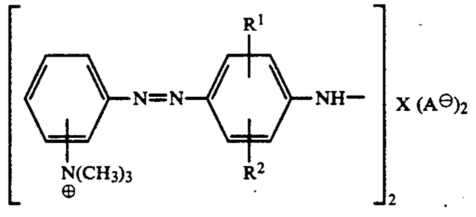

(I)

where $R^1$ and $R^2$ are identical or different and each is independently of the other hydrogen, $C_1$–$C_4$-alkyl or $C_1$–$C_4$-alkoxy, $A^\ominus$ is an anion and X is a bridge member of the formula —CO— or 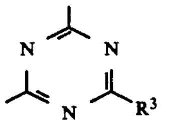

where $R^3$ is chlorine, hydroxy, $C_1$–$C_6$-alkoxy, amino, $C_1$–$C_4$-monoalkyl- or -dialkyl-amino, anilino, N-($C_1$–$C_4$-alkyl)anilino, pyrrolidino, piperidino, morpholino, piperazino or N-($C_1$–$C_4$-alkyl)piperazino.

All the alkyl radicals appearing in the abovementioned formulae may be not only straight-chain but also branched.

$R^1$ and $R^2$ are for example methyl, ethyl, propyl, isopropyl, butyl, isobutyl, sec-butyl, methoxy, ethoxy, propoxy, isopropoxy, butoxy, isobutoxy or sec-butoxy.

Anions $An^\ominus$ are derived from inorganic or organic acids and are for example fluoride, chloride, bromide, hydrogensulfate, sulfate, aminosulfate, methosulfate, ethosulfate, perchlorate, tetrafluoroborate, trichlorozincate, methanesulfonate, benzenesulfonate, p-toluenesulfonate, formate, acetate, propionate, lactate, benzoate, oxalate or succinate.

$R^3$ is for example methoxy, ethoxy, propoxy, isopropoxy, butoxy, isobutoxy, sec-butoxy, pentyloxy, isopentyloxy, neopentyloxy, tert-pentyloxy, hexyloxy, mono- or dimethylamino, mono- or diethylamino, mono- or dipropylamino, mono- or diisopropylamino, mono- or dibutylamino, N-methyl-N-ethylamino, N-methylanilino, N-ethylanilino, N-methylpiperazino or N-ethylpiperazino.

Preference is given to a recording fluid containing a dye of the formula Ia

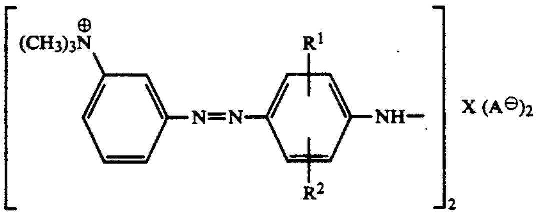

(Ia)

where $R^1$, $R^2$, X and $A^\ominus$ are each as defined above.

Preference is given in particular to those dyes of the formula Ia where $R^1$ and $R^2$ are each independently of the other hydrogen, methyl or methoxy.

The dyes of the formula I are mostly known and described for example in DE-A-2,933,030, or DE-A-2,933,031 or can be obtained by the methods recited therein (loc. cit.).

The novel recording fluid for the ink jet process contains one or more dyes of the formula I and a water-miscible organic solvent.

Water-miscible organic solvents are for example $C_1$–$C_4$-alkanols, such as methanol, ethanol, propanol, isopropanol, butanol, isobutanol, sec-butanol or tert-butanol, carboxamides, such as N,N-dimethylformamide or N,N-dimethylacetamide, lactams, such as N-methylpyrrolid-2-one, cyclic ureas, such as 1,3-dimethylimidazolidin-2-one, ketones or ketoalcohols, such as acetone, methyl ethyl ketone or 2-methyl-2-hydroxypentan-4-one, ethers, such as tetrahydrofuran or dioxane, mono-, oligo- or polyalkylene glycols or thioglycols with $C_2$–$C_6$-alkylene units, such as ethylene glycol, 1,2- or 1,3-propylene glycol, 1,2- or 1,4-butylene glycol, 1,6-hexylene glycol, diethylene glycol, triethylene glycol, thiodiglycol, polyethylene glycol or polypropylene glycol, other polyols, such as glycerol or hexane-1,2,6-triol, $C_1$–$C_4$-alkyl ethers of polyhydric alcohols, such as ethylene glycol monomethyl or monoethyl ether, diethylene glycol monomethyl or monoethyl ether or triethylene glycol monomethyl or monoethyl ether, or dimethyl sulfoxide.

Water-miscible organic solvents which are preferred are for example N-methylpyrrolidin-2-one, mono-, di- or trialkylene glycols with $C_2$–$C_6$-alkylene units, in particular mono-, di- or triethylene glycol, or dimethyl sulfoxide. Very particular preference is given to N-methylpyrrolidin-2-one, diethylene glycol and dimethyl sulfoxide.

The proportion of dye of the formula I is in general from 2 to 10% by weight, preferably from 3 to 5% by weight, each based on the total weight of the recording fluid.

Preference is given to a recording fluid which, besides the dye of the formula I and a water-miscible organic solvent, additionally contains water.

In this case, the novel recording fluid for the ink jet process contains in general from 50 to 95% by weight, in particular from 70 to 95% by weight, each based on the total weight of the solvent system, of water.

The novel recording fluid may also contain assistants, for example agents for affecting the viscosity, such as polyvinyl chloride or cellulose derivatives, surfactants (nonionic, anionic or cationic) or buffer systems.

The following examples will explain the invention in more detail: General method for preparing a recording fluid From 4 to 5 parts by weight of a dye which has been freed from electrolytes by the conventional method of reverse osmosis are dissolved in from 95 to 96 parts by weight of a liquid whose composition is given in the examples below. The solution is pressure-filtered through a Teflon filter of pore size 1 μm and then devolatilized under reduced pressure.

This recording fluid is charged to the receiving vessel of an ink jet printing head which expels the ink in droplet form under the action of supplied heat. This thermal ink jet printing head is used to print a commercial type of paper as used for typescript. The smudge resistance of the script obtained is tested by two methods:

Method 1: marking the script with a commercial text marker

Method 2: rubbing a written area with a moistened finger

The fastness of the script is assessed on a scale from 5 to 1, where 5 denotes the absence of bleeding and 1 denotes that the script has become so smudged that it is no longer legible.

The inks were prepared using the dyes of the formula

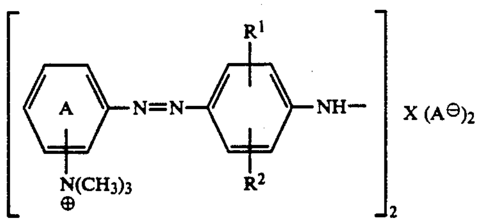

described in Table 1.

TABLE 1

| Dye No. | Position of substituent ⊕ $N(CH_3)_3$ in ring A | $R^1$ | $R^2$ | X | $A^\ominus$ | Color |
|---|---|---|---|---|---|---|
| 1 | 3 | 2-$OCH_3$ | 5-$CH_3$ | CO | chloride | yellow |
| 2 | 3 | 2-$OCH_3$ | H | CO | chloride | yellow |
| 3 | 3 | 2-$OCH_3$ | 5-$CH_3$ | 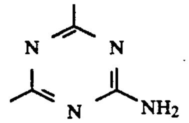 | chloride | yellow |
| 4 | 3 | H | 5-$CH_3$ | 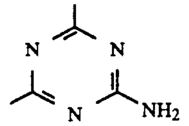 | chloride | yellow |

Dyes no. 1 and no. 2 were prepared as described in DE-A-2,933,030 (Examples 1 and 2) and dyes no. 3 and no. 4 as described in DE-A-2,933,031 (Example 1).

The composition of the inks and the smudge resistance ratings of the script are reported in Table 2. The water-miscible solvents (diethylene glycol or N-methylpyrrolidin-2-one) are abbreviated to DEG and NMP. W denotes water.

TABLE 2

| Application Example No. | Dye No. | Proportion of dye in recording fluid (% by weight) | Composition of solvent system (parts by weight) | Color | Fastness by Method 1 | Fastness by Method 2 |
|---|---|---|---|---|---|---|
| 1 | 1 | 4,5 | W:DEG = 9:1 | yellow | 5 | 4-5 |
| 2 | 2 | 5,0 | W:DEG = 9:1 | yellow | 5 | 5 |
| 3 | 3 | 4,0 | W:DEG:NMP = 8:1:1 | yellow | 4-5 | 4-5 |
| 4 | 4 | 4,0 | W:DEG:NMP = 8:1:1 | yellow | 5 | 4-5 |

We claim:

1. An ink jet process which comprises applying a recording fluid consisting essentially of 2-10% by weight of a dye, a water-miscible organic solvent, and 70 to 95% by weight of water, wherein the dye is represented by the formula I

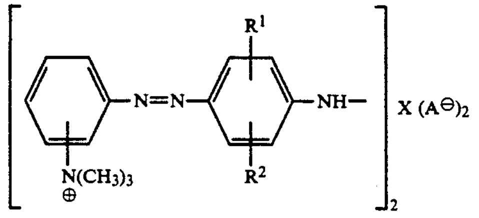

(I)

where $R^1$ and $R^2$ are identical or different and each is independently of the other hydrogen, $C_1$–$C_4$-alkyl or $C_1$–$C_4$-alkoxy, $A^\theta$ is an anion and X is a bridge member of the formula —CO— or 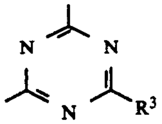

where $R^3$ is chlorine, hydroxy, $C_1$–$C_6$ alkoxy, amino, $C_1$–$C_4$-monoalkyl- or -dialkyl-amino, anilino, N-

($C_1$–$C_4$-alkyl)anilino, pyrrolidino, piperidino, morpholino, piperazino or N-($C_1$–$C_4$-alkyl)piperazino.

2. An ink jet process as claimed in claim 1, wherein the dye is a dye of the formula Ia (Ia)

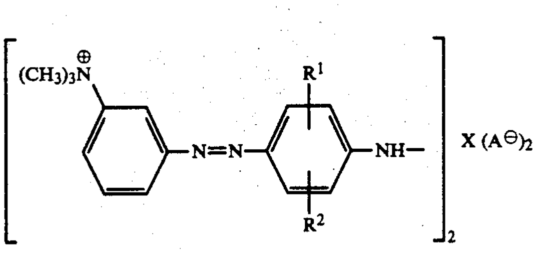

where $R^1$, $R^2$, X and $A^\theta$ are such as defined in claim 1.

* * * * *